(12) United States Patent
Jehle et al.

(10) Patent No.: US 10,006,790 B2
(45) Date of Patent: Jun. 26, 2018

(54) FLOW-RATE MEASUREMENT ASSEMBLY ACCORDING TO THE DIFFERENTIAL-PRESSURE MEASUREMENT PRINCIPLE

(71) Applicant: Endress + Hauser GmbH + Co. KG, Maulburg (DE)

(72) Inventors: Max Jehle, Wehr (DE); Davide Parrotto, Weil am Rhein (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days. days.

(21) Appl. No.: 15/535,451

(22) PCT Filed: Nov. 18, 2015

(86) PCT No.: PCT/EP2015/076902
§ 371 (c)(1),
(2) Date: Jun. 13, 2017

(87) PCT Pub. No.: WO2016/096296
PCT Pub. Date: Jun. 23, 2016

(65) Prior Publication Data
US 2017/0328750 A1 Nov. 16, 2017

(30) Foreign Application Priority Data

Dec. 19, 2014 (DE) .......................... 10 2014 119 240

(51) Int. Cl.
*G01F 1/34* (2006.01)
*G01F 1/36* (2006.01)
(Continued)

(52) U.S. Cl.
CPC ................ *G01F 1/363* (2013.01); *G01F 1/42* (2013.01); *G01F 25/0007* (2013.01)

(58) Field of Classification Search
CPC ..................................... G01F 1/34; G01F 1/36
See application file for complete search history.

(56) References Cited

U.S. PATENT DOCUMENTS 5,680,109 A * 10/1997 Lowe .................... G01L 27/007
137/557
7,260,496 B2 8/2007 Hashizume
(Continued)

FOREIGN PATENT DOCUMENTS

DE 102014119240 A1 6/2016
EP 1840549 A2 10/2007
(Continued)

OTHER PUBLICATIONS

German Search Report, German Patent Office, Munich, DE, dated Sep. 10, 2015.
(Continued)

*Primary Examiner* — Jewel V Dowtin
(74) *Attorney, Agent, or Firm* — Bacon & Thomas, PLLC

(57) ABSTRACT

A flow-rate measurement assembly for measuring a flow rate of a medium through a measurement pipe, comprising at least one differential-pressure producer, and comprising a differential-pressure measurement transducer for providing a differential-pressure measurement signal, which depends upon the difference between the high-pressure-side media pressure and the low-pressure-side media pressure. The difference is a measure of the flow rate of the medium. The evaluating unit is designed to determine a relationship between the differential-pressure measurement signal and a characteristic parameter of a fluctuation of the differential-pressure measurement signal, to judge the determination of a monotonically decreasing relationship between the differential-pressure measurement signal and the characteristic parameter to be an indication of a clogged high-pressure line, and to judge the determination of a monotonically (Continued)

increasing relationship between the differential-pressure measurement signal and the characteristic parameter, the monotonically increasing relationship of which is significantly stronger than the monotonically increasing relationship of an unclogged flow-rate measurement assembly, as an indication of a clogged low-pressure line.

4 Claims, 3 Drawing Sheets

(51) Int. Cl.
*G01F 1/42* (2006.01)
*G01F 25/00* (2006.01)

(56) References Cited

U.S. PATENT DOCUMENTS

| | | | |
|---|---|---|---|
| 7,406,387 B2 | 7/2008 | Hashizume | |
| 7,523,667 B2* | 4/2009 | Brown | G01F 25/0007 73/592 |
| 7,630,861 B2* | 12/2009 | Longsdorf | G08C 19/02 370/410 |
| 7,650,245 B2 | 1/2010 | Hashizume | |
| 7,949,495 B2* | 5/2011 | Wiklund | G01F 1/363 702/183 |
| 2004/0068392 A1 | 4/2004 | Mylaraswamy | |
| 2004/0204883 A1 | 10/2004 | Daugert | |
| 2004/0249583 A1* | 12/2004 | Eryurek | G01F 1/363 702/47 |
| 2006/0206288 A1 | 9/2006 | Brahmajosyula | |
| 2006/0277000 A1* | 12/2006 | Wehrs | G01F 15/00 702/183 |
| 2017/0328750 A1 | 11/2017 | Jehle | |

FOREIGN PATENT DOCUMENTS

| | | |
|---|---|---|
| JP | 2006105707 A | 4/2006 |
| WO | 2008061551 A1 | 5/2008 |

OTHER PUBLICATIONS

International Search Report, EPO, The Netherlands, dated Jan. 27, 2016.
English Translation of the International Preliminary Report on Patentability, WIPO, Geneva, CH, dated Jun. 29, 2017.

* cited by examiner

FLOW-RATE MEASUREMENT ASSEMBLY ACCORDING TO THE DIFFERENTIAL-PRESSURE MEASUREMENT PRINCIPLE

TECHNICAL FIELD

The invention relates to a flow-rate measurement assembly according to the differential-pressure measurement principle, with a high-pressure line and a low-pressure line, and a method for detecting a clogged high-pressure line or low-pressure line. Differential-pressure measurement assemblies according to the differential-pressure measurement principle with high-pressure lines and low-pressure lines are especially used for flow-rate measurement or filter monitoring, wherein, in the direction of flow, the high-pressure line and the low-pressure line are connected above and below a differential-pressure producer, such as an orifice or a Venturi nozzle, or a filter, to a media-carrying line in order to transfer the differential pressure via the medium to a differential-pressure measurement transducer of the differential-pressure measurement assembly. Operation of these measurement assemblies may lead to clogging of the high-pressure line and/or the low-pressure line, which impairs reliable measurement. Measures for detecting the clogging of the high-pressure line and the low-pressure line at an early stage are therefore known.

BACKGROUND DISCUSSION

U.S. Pat. No. 5,680,109 A describes a differential-pressure sensor which has a high-pressure impulse line and a low-pressure impulse line, which are respectively connected to a process connection. An absolute-pressure sensor is respectively connected to the high-pressure impulse line and the low-pressure impulse line. In order to determine whether the high-pressure impulse line or the low-pressure impulse line is blocked, a noise signal from the corresponding absolute-pressure sensor is determined. A variance in the noise signal is determined and compared to a threshold value. If the variance is less than the threshold value, an impulse line blockage is indicated.

The approach above of analyzing fluctuations is, in principle, expedient, but very complex, since additional sensors are required.

SUMMARY OF THE INVENTION

It is therefore the object of the present invention to provide a flow-rate measurement assembly according to the differential-pressure measurement principle, and a method, which make it possible to more easily detect whether the high-pressure line or the low-pressure line is clogged. The aim is achieved according to the invention by the flow-rate measurement assembly for measuring a flow rate of a medium through a measurement pipe comprises at least one differential-pressure producer located in the measurement pipe, which producer especially brings about a reduction of a cross-sectional area through which the medium flows inside the measurement pipe in the region of the differential-pressure producer and thus a drop in the media pressure dependent upon the dimensions of the differential-pressure producer and on the flow rate, a differential-pressure measurement transducer for detecting a difference between a high-pressure-side media pressure and a low-pressure-side media pressure and for providing a differential-pressure measurement signal, which depends upon the difference between the high-pressure-side media pressure and the low-pressure-side media pressure, wherein the difference between the high-pressure-side media pressure and the low-pressure-side media pressure is a measure for the flow rate of the medium, a high-pressure line, which is connected to a high-pressure inlet of the differential-pressure measurement transducer in order to apply the high-pressure-side media pressure to the differential-pressure measurement transducer, a low-pressure line, which is connected to a low-pressure inlet of the differential-pressure measurement transducer in order to apply the low-pressure-side media pressure to the differential-pressure measurement transducer, an evaluating unit for evaluating the differential-pressure measurement signal, wherein the evaluating unit is designed to determine a relationship between the differential-pressure measurement signal and a characteristic parameter of a noise or of a fluctuation in the differential-pressure measurement signal, judge the determination of a monotonically decreasing relationship between the differential-pressure measurement signal and the characteristic parameter to be an indication of a clogged high-pressure line, and judge the determination of a monotonically increasing relationship between the differential-pressure measurement signal and the characteristic parameter, the monotonically increasing relationship of which is significantly stronger than the monotonically increasing relationship of an unclogged flow-rate measurement assembly, as an indication of a clogged low-pressure line.

For the decision as to whether or not the high-pressure line or the low-pressure line is clogged, the noise or fluctuation is considered as a function of the differential-pressure measurement signal. If the function has a negative linear coefficient, the high-pressure line is clogged. On the other hand, if the function has a significantly greater linear coefficient than the function of a non-clogged flow-rate measurement assembly, the low-pressure line is clogged. The detection of a clogging by means of the flow-rate measurement assembly according to the invention is especially advantageous in very dynamic processes.

In an alternative embodiment of the invention, the monotonically increasing or decreasing relationship between the differential-pressure measurement signal and the characteristic parameter is approximately modeled by a linearly increasing or decreasing function, wherein the significantly more strongly monotonically increasing relationship is an approximately linearly increasing function, the linear coefficient of which is significantly greater than the error-corrected linear coefficient of a linearly increasing function of an unclogged flow-rate measurement assembly.

In an alternative embodiment of the invention, the monotonically increasing or decreasing relationship between the differential-pressure measurement signal and the characteristic parameter is approximately modeled by a quadratically increasing or decreasing function, wherein the significantly more strongly monotonically increasing relationship is an approximately quadratically increasing function, the coefficient of the square term of which is significantly greater than the error-corrected coefficient of the square term of a quadratically increasing function of an unclogged flow-rate measurement assembly.

The object of the invention is also achieved by a method. The method includes a method for monitoring a flow-rate measurement assembly—especially, according to one of the preceding claims—comprising the method steps of: at least temporarily detecting a time curve of the differential-pressure measurement signal and a characteristic parameter of a noise or a fluctuation in the differential-pressure measurement signal, determining a relationship between the differential-pressure measurement signal and a characteristic parameter of a noise or a fluctuation in the differential-pressure measurement signal, wherein the determination of a monotonically decreasing relationship between the differential-pressure measurement signal and the characteristic parameter is to be judged as an indication of a clogged high-pressure line, and the determination of a monotonically increasing relationship between the differential-pressure measurement signal and the characteristic parameter, the monotonically increasing relationship of which is significantly stronger than the monotonically increasing relationship of an unclogged flow-rate measurement assembly, is to be judged as an indication of a clogged low-pressure line.

BRIEF DESCRIPTION OF THE DRAWINGS

The invention is explained in more detail based upon the following drawings. Illustrated are.

DETAILED DISCUSSION IN CONJUNCTION WITH THE DRAWINGS

Figure 1:
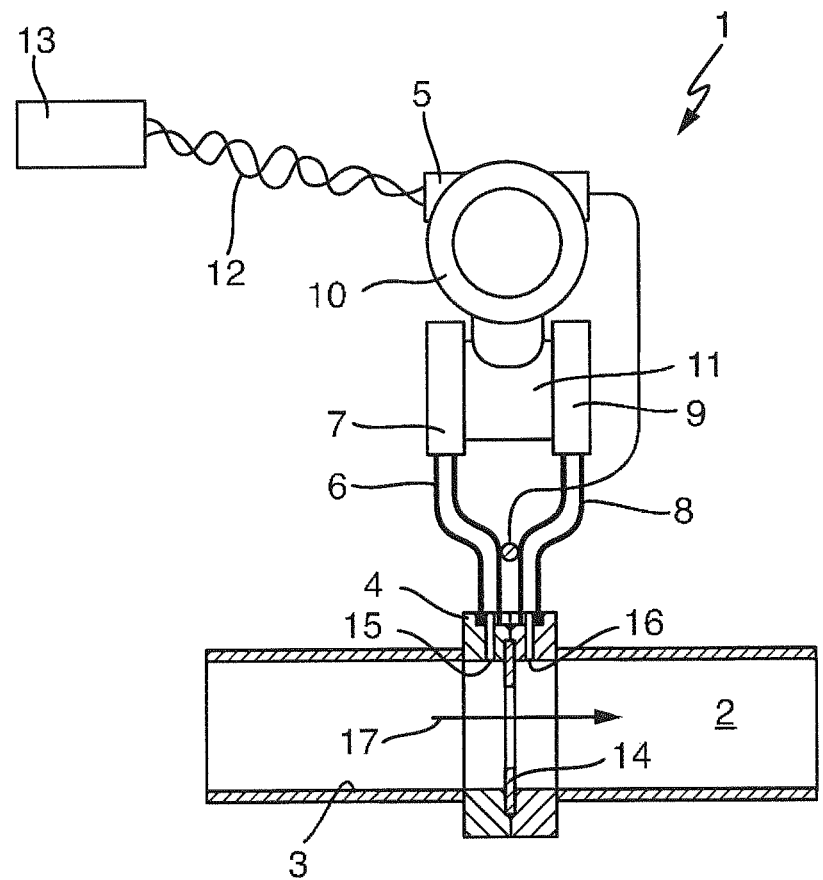
FIG. 1: is a sketched longitudinal section of the flow-rate measurement assembly according to the invention.

FIG. 1 shows an exemplary embodiment of a flow-rate measurement assembly 1 according to the invention, comprising a differential-pressure measurement transducer 5. The differential-pressure measurement transducer 5 has an evaluating unit 10, which is designed as an electronics module. The differential-pressure measurement transducer 5 measures a differential pressure between a high-pressure inlet 7 and a low-pressure inlet 9 of the differential-pressure measurement transducer 5, wherein the high-pressure inlet 7 and the low-pressure inlet 9 are designed as a high-pressure-side process connection flange and a low-pressure-side process connection flange respectively.

The differential-pressure measurement transducer 5 further has a sensor module 11, which contains the evaluating unit 10. The signals of the sensor module 11 are processed by the evaluating unit 10. The evaluating unit 10 is connected to a process control system 13 via a two-wire line 12, wherein the evaluating unit 10 communicates and is supplied with energy via the two-wire line 12. The two-wire line 12 can be operated especially as a field bus according to the Profibus or Foundation Fieldbus standard, or the HART standard. Such differential-pressure measurement transducers are known per se and are, for example, manufactured and marketed under the brand Deltabar by the applicant.

The flow-rate measurement assembly 5 also comprises a differential-pressure producer 4 for installation in a measurement pipe 3. The differential-pressure producer 4 comprises an orifice 14, a high-pressure-side pressure-tapping channel 15 on a high-pressure side of the orifice 14, and a low-pressure-side pressure-tapping channel 16 on a low-pressure side of the orifice 14. The high-pressure inlet 7 is connected to the high-pressure-side pressure-tapping channel 15 via a high-pressure line 6, and the low-pressure inlet 9 is connected to the low-pressure-side pressure-tapping channel 16 via a low-pressure line 8. The terms "high-pressure-side" and "low-pressure-side" refer to a pressure difference 17 caused by a flow (from left to right in the drawing), wherein this pressure difference is proportional to the square of the flow rate and is, for example, on the order of magnitude of around 10 to 100 hPa (of around 10 to 100 mbar).

The static pressure, which is superimposed by this flow-dependent pressure difference, can, for example, be 0.1 MPa to around 10 MPa (from 1 bar to around 100 bar). The pressure difference is detected by a sensor element of the sensor module 11, wherein the sensor module 11 outputs a sensor module signal that depends upon the detected pressure difference to the evaluating unit 10, wherein the processing circuit of the evaluating unit 10 generates, based upon the sensor module signal, a differential-pressure measurement signal that represents the pressure difference and outputs it to the process control system 13 via the two-wire line 12.

Time series of the differential-pressure measurement signal and/or of fluctuations of the differential-pressure measurement signal can be stored in a data memory of the evaluating unit 10 and/or the process control system 13.

Basically, it must be assumed that fluctuations or noise in the pressure of a flowing medium become greater with increasing flow rate of the medium. In an intact flow-rate measurement assembly, these fluctuations will, however, reach the differential-pressure measurement transducer via the high-pressure line and the low-pressure line, and will there compensate for each other to some extent.

If the high-pressure line or the low-pressure line is clogged, this compensation will become weaker with time, so that the fluctuations or the noise in the differential-pressure measurement signal decrease or increase. This involves, especially, fluctuations in a frequency range of more than 1 Hz—especially, more than 10 Hz or more than 100 Hz.

If the fluctuation in the differential-pressure measurement signal at a given flow rate or average differential pressure has increased in comparison to reference data that were collected with the differential-pressure lines open, this is a first indication of a completely or partially clogged high-pressure line or low-pressure line.

The invention contributes to the prevention of faulty diagnoses of a clogged high-pressure line or low-pressure line as a result of increasing or decreasing fluctuations in the differential-pressure measurement signal.

Figure 2A:
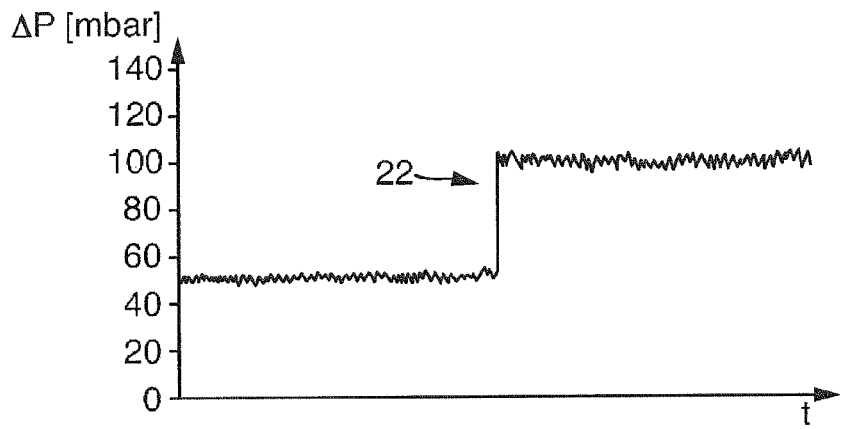
FIG. 2a: is a graphical representation of the differential-pressure measurement signal as a function of time, in the case of an unclogged flow-rate measurement assembly.

FIG. 2a shows a graphical representation, in which the differential-pressure measurement signal 22 of the differential pressure Δp in hPa (mbar) is illustrated as a function of time for an unclogged flow-rate measurement assembly. At about an average point in time, the flow rate in the measurement pipe 3 is raised from 0.7 m³ per hour to 1 m³ per hour. This results in a change in the differential-pressure measurement signal 22 of the differential pressure Δp between the high-pressure side and the low-pressure side of the differential-pressure producer. The differential-pressure measurement signal 22 of the differential pressure Δp increases in this case from about 50 hPa to about 100 hPa (from about 50 mbar to about 100 mbar). It can be seen clearly that the noise or the fluctuation σ in the differential-pressure measurement signal 22 of the differential pressure Δp is also doubled after the doubling.

Figure 2B:
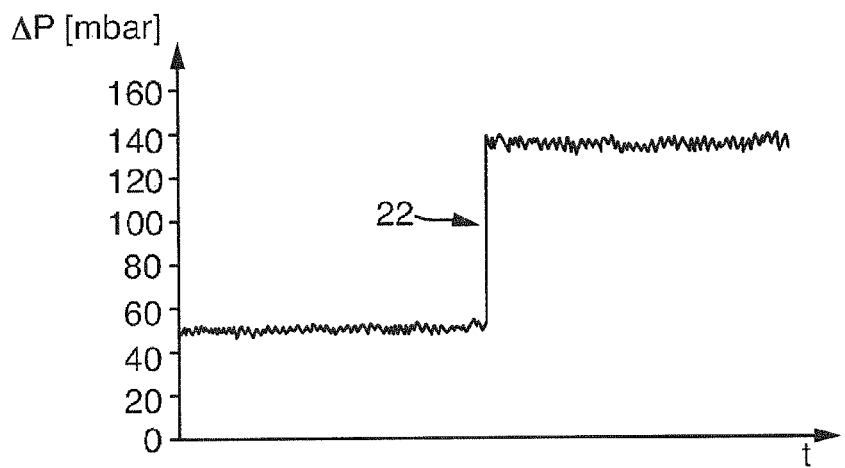
FIG. 2b: is a graphical representation of the differential-pressure measurement signal as a function of time, in the case of a clogged low-pressure line.

FIG. 2b shows another graphical representation, in which the differential-pressure measurement signal 22 of the differential pressure Δp in hPa (mbar) is illustrated as a function of time for a clogged low-pressure line. At about the same point in time as in FIG. 2a, the flow rate in the measurement pipe 3 was raised from about 0.7 m³ per hour to about 1 m³ per hour. It can be seen clearly that, with a doubling in the noise or the fluctuation σ, the differential-pressure measurement signal 22 of the differential pressure Δp is doubled from about 50 hPa to almost 140 hPa (from about 50 mbar to almost 140 mbar). This is an increase in the differential-pressure measurement signal 22 of the differential pressure Δp of almost threefold. It can be derived therefrom that, with a clogged low-pressure line, an increase in the noise or the fluctuation σ is accompanied by a significantly larger increase in the differential-pressure measurement signal 22 of the differential pressure Δp.

Figure 2C:
FIG. 2c: is a graphical representation of the differential-pressure measurement signal as a function of time, in the case of a clogged high-pressure line.

FIG. 2c shows another graphical representation, in which the differential-pressure measurement signal 22 of the differential pressure Δp in hPa (mbar) is illustrated as a function of time for a clogged high-pressure line. In this case, at about the same point in time as in FIG. 2a or FIG. 2c, the flow rate in the measurement pipe 3 was also raised from about 0.7 m³ per hour to about 1 m³ per hour. It can be seen clearly that, with a doubling in the noise or the fluctuation σ, the differential-pressure measurement signal 22 of the differential pressure Δp drops from about 50 hPa to about 30 hPa (from about 50 mbar to about 30 mbar). This is a reduction in the differential-pressure measurement signal 22 of the differential pressure Δp of almost half. It can be derived therefrom that, with a clogged high-pressure line, an increase in the noise or the fluctuation σ is accompanied by a reduction in the differential-pressure measurement signal 22 of the differential pressure Δp.

Figure 3:
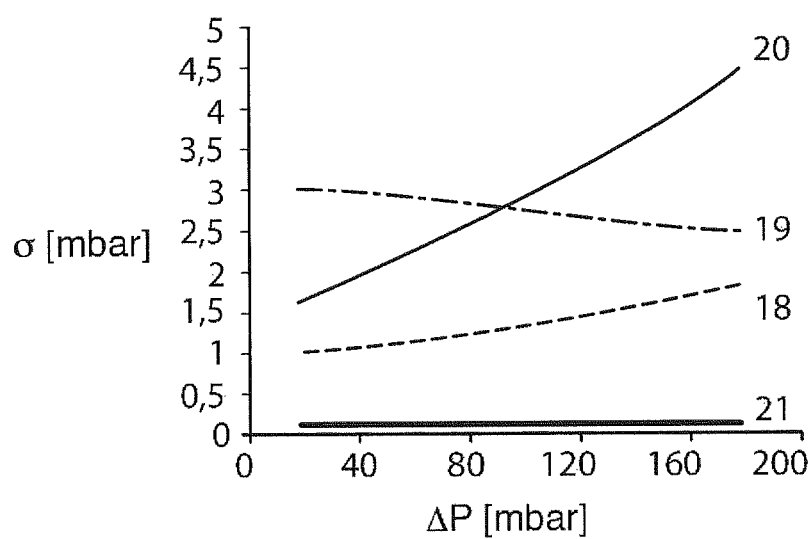
FIG. 3: is a graphical representation of the fluctuation or noise in the differential-pressure measurement signal as a function of the differential-pressure measurement signal, under several conditions.

FIG. 3 shows a graphical representation, in which the average noise or the average fluctuation σ in the differential-pressure measurement signal 22 of the differential pressure Δp is illustrated as a function of the differential-pressure measurement signal 22 of the differential pressure Δp under four different conditions. The relationships between all four conditions are modeled by linear functions 18, 19, 20, 21.

Each linear function describes a condition of the high-pressure line and the low-pressure line. These four conditions are: high-pressure line and low-pressure line open (function 18), high-pressure line clogged and low-pressure line open (function 19), high-pressure line open and low-pressure line clogged (function 20), high-pressure line and low-pressure line clogged (function 21).

It can be seen clearly that the function 19 under the condition "high-pressure line clogged and low-pressure line open" has a negative linear coefficient (−0.003). Furthermore, the function 20 under the condition "high-pressure line open and low-pressure line clogged" has a linear coefficient (+0.012), which is significantly greater than the linear coefficient of function 18 (+0.003) under the condition "high-pressure line and low-pressure line open." The linear coefficient of function 20 is about four times greater than the linear coefficient of function 18. Function 21, in which both the high-pressure line and the low-pressure line are clogged, has a linear coefficient of zero. Consequently, all conditions can be detected on the basis of their characteristic linear coefficients.

The invention claimed is:

1. A flow-rate measurement assembly for measuring a flow rate of a medium through a measurement pipe, said measurement pipe comprising:
   at least one differential-pressure producer located in the measurement pipe, which differential-pressure producer brings about a reduction of a cross-sectional area through which the medium flows inside the measurement pipe in the region of said differential-pressure producer and thus a drop in the media pressure dependent upon the dimensions of said differential-pressure producer and upon the flow rate;
   said measurement assembly comprising:
   a differential-pressure measurement transducer for detecting a difference between a high-pressure-side media pressure and a low-pressure-side media pressure and for providing a differential-pressure measurement signal, which depends upon the difference between the high-pressure-side media pressure and the low-pressure-side media pressure, wherein the difference between the high-pressure-side media pressure and the low-pressure-side media pressure is a measure for the flow rate of the medium;
   a high-pressure line, which is connected to a high-pressure inlet of said differential-pressure measurement transducer in order to apply the high-pressure-side media pressure to said differential-pressure measurement transducer,
   a low-pressure line, which is connected to a low-pressure inlet of said differential-pressure measurement transducer in order to apply the low-pressure-side media pressure to said differential-pressure measurement transducer; and
   an evaluating unit for evaluating the differential-pressure measurement signal, wherein:
   said evaluating unit is designed to:
   determine a relationship between the differential-pressure measurement signal and a characteristic parameter of a noise or of a fluctuation in the differential-pressure measurement signal,
   judge the determination of a monotonically decreasing relationship between the differential-pressure measurement signal and the characteristic parameter to be an indication of a clogged high-pressure line; and
   judge the determination of a monotonically increasing relationship between the differential-pressure measurement signal and the characteristic parameter, the monotonically increasing relationship of which is significantly stronger than the monotonically increasing relationship of an unclogged flow-rate measurement assembly, as an indication of a clogged low-pressure line.

2. The flow-rate measurement assembly according to claim 1, wherein:
   said monotonically increasing or decreasing relationship between the differential-pressure measurement signal and the characteristic parameter is approximately modeled by a linearly increasing or decreasing function; and
   the significantly more strongly monotonically increasing relationship is an approximately linearly increasing function, the linear coefficient of which is significantly greater than the error-corrected linear coefficient of a linearly increasing function of an unclogged flow-rate measurement assembly.

3. The flow-rate measurement assembly according to claim 1, wherein:
said monotonically increasing or decreasing relationship between the differential-pressure measurement signal and the characteristic parameter is approximately modeled by a quadratically increasing or decreasing function; and
the significantly more strongly monotonically increasing relationship is an approximately quadratically increasing function, the coefficient of the square term of which is significantly greater than the error-corrected coefficient of the square term of a quadratically increasing function of an unclogged flow-rate measurement assembly.

4. A method for monitoring a flow-rate measurement assembly, comprising the method steps of:
at least temporarily detecting a time curve of the differential-pressure measurement signal and a characteristic parameter of a noise or a fluctuation in the differential-pressure measurement signal;

determining a relationship between the differential-pressure measurement signal and a characteristic parameter of a noise or a fluctuation in the differential-pressure measurement signal, wherein the determination of a monotonically decreasing relationship between the differential-pressure measurement signal and the characteristic parameter is to be judged as an indication of a clogged high-pressure line; and the determination of a monotonically increasing relationship between the differential-pressure measurement signal and the characteristic parameter, the monotonically increasing relationship of which is significantly stronger than the monotonically increasing relationship of an unclogged flow-rate measurement assembly, is to be judged as an indication of a clogged low-pressure line.

* * * * *